(12) United States Patent
Luo et al.

(10) Patent No.: US 7,390,566 B2
(45) Date of Patent: Jun. 24, 2008

(54) VISCOSE PRODUCT

(75) Inventors: Mengkui Luo, Auburn, WA (US); John A. Westland, Auburn, WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 11/427,927

(22) Filed: Jun. 30, 2006

(65) Prior Publication Data

US 2008/0003429 A1    Jan. 3, 2008

(51) Int. Cl.
*B32B 23/00* (2006.01)
(52) U.S. Cl. .......................... 428/393; 428/354; 428/375

(58) Field of Classification Search ................. 428/364, 428/375, 393
See application file for complete search history.

(56) References Cited

U.S. PATENT DOCUMENTS 6,440,547 B1 *  8/2002  Luo et al. ................ 428/292.7

* cited by examiner

*Primary Examiner*—Arti Singh

(57) ABSTRACT

Pulp with a high hemicellulose level is blended with a dissolving grade pulp and converted to viscose. Blending can be performed during steeping or after steeping. Spinning of the viscose containing the blend, into filaments yields fibers with strength properties that are at least equal to those of the dissolving pulp alone.

5 Claims, No Drawings

VISCOSE PRODUCT

FIELD

The present application relates to a method for using high hemicellulose pulps in viscose manufacture and the resulting fibers therefrom.

DESCRIPTION

Pulp used for rayon manufacture has a high alpha cellulose content generally in the range of 88 to 98 percent where alpha cellulose represents the insoluble fraction of pulp that is not dissolved when pulp is treated with 17.5% sodium hydroxide. Such pulps are termed dissolving pulps. To achieve this degree of purity, manufacturers must remove a substantial amount of the hemicellulose by, for example, steam prehydrolysis prior to cooking a Kraft pulp, or by cold caustic extraction in the bleaching process, thereby adding substantially to the cost of manufacture. A high percent of pentosans and other hemicelluloses are objectionable in rayon grade pulps due to problems they cause in filtration, spinning, fiber properties and also because they are an indication that the morphological structure of the pulp has not been altered sufficiently to obtain the desired reactivity.

Briefly, the viscose process is as follows. Steeping, or mercerization, requires 18% sodium hydroxide and is carried out either in sheet steeping in hydraulic presses with perforated steel plates in batches of cellulose sheets vertically inserted, or as slurry steeping where a slurry of fibers in approximately 18 percent caustic is prepared. The former operation is batchwise and the excess caustic is removed by draining the caustic and then pressing the alkali cellulose to a fixed press weight ratio. The slurry steeping operation is continuous or batch and is followed by pressing of the slurry by, for example, perforated roll presses or vacuum filters with press rolls. At this point the alkali cellulose contains about 30 percent cellulose and 15 percent sodium hydroxide. It is then shredded, either batchwise in cooled sigma blade shredders, or continuously in disc shredders to alkali cellulose crumb. The alkali cellulose crumb is then aged in a controlled manner at 15-40° C. for a fixed time depending on the end product use to reduce the degree of polymerization in the range of 400 to 600. Xanthation is then conducted in churns or barettes whereby carbon disulfide is charged into the vessel. Approximately three hours are required at 20-35° C. to give a degree of substitution of the xanthate group of about 0.4-0.5. The xanthate crumb is then dissolved in caustic to give viscose which contains cellulose in the form of cellulose xanthate. Dissolution is performed in vessels equipped with paddle stirrers. The viscose is ripened, filtered and deaerated prior to regeneration. Cellulose is regenerated by extrusion of the viscose into coagulation baths, one or two in series, containing sulfuric acid and such salts as sodium sulfate, bisulfate, and bisulfite, magnesium sulfate, ammonium sulfate and zinc sulfate. The composition of the baths varies with the effects desired. A typical bath contains about 130 g/l $H_2SO_4$, 280 g/l $Na_2SO_4$, 15 g/l $ZnSO_4$ and 60 g/l glucose. If two bat in series the second one is acidic to complete the regeneration, whereas the first can be either acidic or a mainly salt bath. The temperature of the coagulation baths is kept at around 50° C., spinning speed is around 100 m/min and the bath travel is normally around 25 cm or longer. The spinneret holes vary in diameter from 0.05 to 0.30 mm. The number of filaments per thread varies from 10 to 1,000 and in the case of rayon staple fiber, up to 50,000. The emerging yarn is stretched by godet wheels at different speed differentials and subsequently wound on a rotating bobbin or collected as a as a centrifugal cake in a rotating bucket or fed to a cutter. The bobbins, cakes or cut staple fibers are then washed, desulfurized, bleached, and finishing treatment applied.

Cellophane manufacture follows the same pattern as textile yarns up to the stage of coagulation, with small changes in the caustic handling system. The viscose is extruded through a slit into one or two coagulation baths the first of which may only contain salts. The cellophane web passes through finishing baths, one of which contains glycerol or other plasticizers and finally into a dryer section and then further modified in the converting industry such as laminating, printing and combination with plastic films, metal foils, paper or board.

It has now been shown that an experimental non dissolving grade pulp with high hemicellulose levels, (hereinafter called pulp with high hemicellulose levels), and consequently lower cost, can be used in the viscose process to achieve fiber properties which are comparable to those of dissolving pulps. In the process, the high hemicellulose pulp is blended with a dissolving grade pulp in either the sheet steeping process or the slurry process.

The term hemicellulose refers to a heterogeneous group of low molecular weight carbohydrate polymers that are associated with cellulose in wood. Hemicelluloses are amorphous, branched polymers, in contrast to cellulose which is a linear polymer. The principal, simple sugars that combine to form hemicelluloses are D-glucose, D-xylose, D-mannose, L-arabinose, D-galactose, D-glucuronic acid and D-galacturonic acid. As used herein, hemicellulose refers to the weight percent of xylan and mannan in oven dry pulp. In one embodiment a high hemicellulose pulp contains at least about 12 percent by weight hemicellulose. In another embodiment the pulp contains at least about 10 percent by weight hemicellulose. The term high hemicellulose means at least 10 percent by weight hemicellulose, in pulp based on oven dry weight of pulp. Oven dry weight means the pulp was dried at 105° C. for at least one hour.

In one embodiment a high hemicellulose pulp is blended with a dissolving pulp in the sheet steeping process. The two different pulps can be placed in sheet form in separate compartments in the steeping press or they can be placed in separate steeping presses. In either case, after steeping and pressing the sheets to a fixed press weight ratio, (PWR), the pulp is shredded to yield alkali cellulose crumb. The alkali cellulose crumb from the separate steeping presses can be mixed to yield a blended alkali cellulose crumb. Blending can be accomplished either after shredding the alkali cellulose sheets and then aging or after aging the alkali cellulose from each of the two different pulps to a given D.P. of the cellulose. D.P. refers to the degree of polymerization and represents the number of D-glucose monomers in a cellulose molecule. In one embodiment the pulp with high hemicellulose levels is blended with the dissolving grade pulp at a 50 percent level, or less, by total dry weight Of pulp; in another embodiment pulp with high hemicellulose levels is blended with the dissolving grade pulp at a level of 35 percent, or less, by total dry weight of pulp; in another embodiment the pulp with high hemicellulose levels is blended with the dissolving grade pulp at a 20 percent level, or less, by total dry weight of pulp; in yet another embodiment the pulp with high hemicellulose levels is blended with the dissolving pulp at a level of 10 percent, or less, by total dry weight of pulp. Typical properties of two pulps with high hemicellulose levels are presented in Table 1; Table 2, 2A, 3 and 3A represent pulp and viscose processing properties of various pulp blends.

TABLE 1

Typical Pulp Properties for High Hemicelluose Pulps

| Pulp | EF | EK |
|---|---|---|
| α-Cellulose | ~85-87 | ~85-86 |
| $R_{10}$, % | 85 | 82 |
| $R_{18}$, % | 88 | 87 |

TABLE 1-continued

Typical Pulp Properties for High Hemicelluose Pulps

| Pulp | EF | EK |
|---|---|---|
| $S_{18}$, % | 12 | 13 |
| Viscosity, mPa*S | 25-45 | 25-35 |
| Copper Number | 0.6 | 0.6 |
| Cr, mg/kg | <0.03 | <0.03 |
| Cu, mg/kg | 0.3 | 0.3 |
| Fe, mg/kg | 3 | 3 |
| Mn, mg/kg | 20 | 10 |
| K, mg/kg | <0.2 | <0.2 |
| $SiO_2$, mg/kg | 40 | 40-100 |
| LWAFL, mm | 2.1 | 1.2 |

TABLE 2

Pulp and Alkali Cellulose Properties Using Sheet Steeping

| Pulp | Saiccor sulfite | Beech sulfite | EK | PHK | 85% PHK 15% EK | 65% PHK 35% EK | 85% Beech Sulfite 15% EK | 65% Beech Sulfite 35% EK | 85% Saiccor 15% EK |
|---|---|---|---|---|---|---|---|---|---|
| Pulp Parameter | | | | | | | | | |
| D.P. (CED) | 901 | 1171 | 907 | 855 | 867 | 853 | 1151 | 1101 | 912 |
| R 18 (%) | 93.99 | 92.55 | 84.73 | 94.57 | 93.9 | 91.97 | 91.66 | 90.6 | 93.97 |
| R 10 (%) | 90.06 | 88.28 | 83.19 | 91.82 | 92.09 | 88.91 | 87.29 | 86.44 | 89.5 |
| $S_{18}$, % | 6.01 | 7.45 | 15.23 | 5.43 | 6.1 | 8.03 | 8.34 | 9.4 | 6.03 |
| $S_{10}$, % | 9.94 | 11.72 | 16.81 | 8.18 | 11.09 | 11.09 | 12.71 | 13.56 | 10.5 |
| Hemicellulose, % | ~2.3 | 3.59 | 12.5 | 3.19 | 4.9* | 6.5* | 4.9* | 6.7* | ~3.9* |
| Pulp, (g) | 345 | 284 | 293 | 293 | 295 | 292 | 288 | 281 | 296 |
| A.C, (g) | 1142 | 840 | 923 | 832 | 830 | 850 | 869 | 865 | 971 |
| PWR | 3.31 | 2.98 | 3.18 | 2.84 | 2.81 | 2.91 | 3.02 | 3.08 | 3.28 |
| A.C. (%) | 29.58 | 31.39 | 27.67 | 33.87 | 33.73 | 31.96 | 30.51 | 29.56 | 28.6 |
| Alkali (%) | 15.4 | 15.06 | 15.36 | 15.88 | 14.81 | 15.10 | 14.66 | 14.70 | 15.15 |
| Aging Time, Hr. | 27 at 28° C. | 38 at 28° C. | 26. at 28° C. and 20 at 23° C. | 28 at 28° C. | 30 at 28° C. | 27 at 28° C. and 23 at 25° C. | 32.5 at 28° C. | 32.5 at 28° C. and 24 at 20° C. | 29 at 28° C. |
| D.P. (CED) | 592/348 | 573/337 | 594/349 | 585/344 | 628/368 | 540/319 | 585/344 | 564/332 | 591/347 |

Beech Sulfite, from Lenzing; PHK from Buckeye
*calculated value

TABLE 2A

Viscose and Fiber Properties Using Sheet Steeping

| Pulp | Saiccor Sulfite | Beech Sulfite | EK | PHK | 85% PHK, 15% EK | 65% PHK, 35% EK | 85% Beech Sulfite 15% EK | 65% Beech Sulfite 35% EK | 85% Saiccor 15% EK |
|---|---|---|---|---|---|---|---|---|---|
| Viscose Preparation | | | | | | | | | |
| Filter Plugging | No | Yes | Yes | No | No | No | No | No | No |
| Cellulose (%) | 8.2 | 8.35 | 7.81 | 8.5 | 8.29 | 7.82 | 8.16 | 8.18 | 8.26 |
| Alkali (%) | 5.95 | 6.0 | 6.07 | 6.21 | 6.2 | 6.03 | 6.03 | 6.05 | 5.92 |
| D.S. Viscose | 0.50 | 0.47 | 0.52 | 0.52 | 0.52 | 0.54 | 0.53 | 0.51 | 0.50 |
| Ball Fall, 1/8″ (s) | 54 | 53 | 82 | 73 | 58 | 28 | 60 | 46 | 40 |
| KW | 6431 | 23857 | 19702 | 749 | 1042 | 1216 | 2982 | 3729 | 5375 |
| KR | 5235 | 19465 | 13503 | 539 | 824 | 1277 | 2315 | 3236 | 4943 |
| Counts/g viscose (×100) | | | | | | | | | |
| >4 μm | 455 | 772 | 793 | 91 | 77 | 124 | 420 | 496 | 623 |
| >10 μm | 138 | 213 | 157 | 11 | 9 | 15 | 53 | 82 | 187 |
| >20 μm | 7 | 23 | 25 | 1 | 1 | 1 | 4 | 5 | 17 |
| Counts/g cellulose (×100) | | | | | | | | | |
| >4 μm | 5554 | 9250 | 10158 | 1069 | 934 | 1583 | 5150 | 6058 | 7538 |
| >10 μm | 1689 | 2548 | 2013 | 131 | 111 | 192 | 652 | 1003 | 2260 |
| >20 μm | 82 | 278 | 317 | 16 | 12 | 11 | 45 | 62 | 202 |
| Spinning: max draw ratio | 1.4 | 1.5-1.6 | 1.5 | 1.5-1.5 | 1.5 | 1.5 | 1.5 | 1.5 | 1.5 |

TABLE 2A-continued

Viscose and Fiber Properties Using Sheet Steeping

| Pulp | Saiccor Sulfite | Beech Sulfite | EK | PHK | 85% PHK, 15% EK | 65% PHK, 35% EK | 85% Beech Sulfite 15% EK | 65% Beech Sulfite 35% EK | 85% Saiccor 15% EK |
|---|---|---|---|---|---|---|---|---|---|
| Fiber Properties | | | | | | | | | |
| Tensile strength (cN/tex) | 20.5 | 19.2 | 20.96 | 20.99 | 20.6 | 20.8 | 21.0 | 20.5 | 20.3 |
| Elongation (%) | 10.05 | 13.2 | 12.05 | 11.25 | 12.3 | 12.59 | 11.1 | 11.52 | 11.6 |
| Modulus (cN/tex) | 1035 | 954 | 1050 | 1048 | 1038 | 1016 | 1069 | 1037 | 1054 |

Beech Sulfite, from Lenzing; PHK from Buckeye, Ball fall, KW, KR and viscose and cellulose counts were determined on unfiltered viscose after 20 hr.

TABLE 3

Pulp And Alkali Cellulose Properties Using Sheet Steeping

| Pulp | 85% PHK 15% EF | 85% Beech Sulfite 15% EF | 100% EF |
|---|---|---|---|
| Pulp Parameter | | | |
| D.P. (CED) | 860 | 1009 | 822 |
| R 18 (%) | 93.97 | 89.75 | 86.22 |
| R 10 (%) | 92.03 | 86.53 | 83.99 |
| $S_{18}$, % | 6.03 | 10.25 | 13.78 |
| $S_{10}$ | 7.97 | 13.47 | 16.01 |
| % Hemicellulose | 4.59* | 4.93* | ~12.5 |
| A.C. | | | |
| Pulp, (g) | 291 | 288 | 295 |
| A.C, (g) | 826 | 850 | 833 |
| Press factor | 2.84 | 2.95 | 2.82 |
| A.C. (%) | 34.26 | 30.95 | 30.82 |
| Alkali (%) | 15.49 | 15.30 | 15.52 |
| Aging time, Hr. | 29 at 28° C. and 26.5 at 20° C. | 32.5 at 28° C. | 25.5 at 28° C. |
| D.P. (CED) | 562/331 | 456/272 | 553/326 |

* Calculated value

TABLE 3A

Viscose and Fiber Properties Using Sheet Steeping

| Pulp | 85% PHK 15% EF | 85% Beech Sulfite 15% EF | 100% EF |
|---|---|---|---|
| Viscose Preparation | | | |
| Filter Plugging | No | No | No |
| Cellulose (%) | 8.26 | 8.35 | 8.18 |
| Alkali (%) | 5.98 | 5.99 | 5.84 |
| D.S. Viscose | 0.49 | 0.53 | 0.51 |
| Unfiltered viscose after 20 hr. | | | |
| Ball Fall, 3.18 mm (s) | 28 | 16.6 | 19.9 |
| KW | 463 | 2887 | 6095 |
| KR | 489 | 3756 | 7371 |
| Counts/g viscose (×100) | | | |
| >4 µm | 37 | 334 | 370 |
| >10 µm | 7 | 62 | 74 |
| >20 µm | 1 | 6 | 20 |
| Counts/g cellulose (×100) | | | |
| >4 µm | 444 | 4000 | 4524 |
| >10 µm | 90 | 744 | 903 |
| >20 µm | 11 | 71 | 241 |
| Spinning: max draw ratio | 1.5 | — | 1.6 |
| Fiber Properties | | Not spinnable | |
| Tensile strength (cN/tex) | 21.4 | — | 20.1 |
| Elongation (%) | 11.2 | — | 10.2 |
| Modulus (cN/tex) | 1065 | — | 1104 |

Fiber properties of viscose preparations made from blends of pulp are at least equal to those of the dissolving pulp, Table 2A and 3A. In one embodiment the tensile strength of the fibers prepared from a viscose containing high hemicellulose pulp are at least equal to those prepared from a dissolving grade pulp. In another embodiment the tensile strength of the fibers prepared from a viscose containing blends of the pulp with high hemicellulose levels and a dissolving grade pulp are at least equal to those prepared from a dissolving grade pulp alone. Elongation and modulus of fibers prepared only from the pulps with high hemicellulose, designated as EK and EF, are at least equal to the dissolving grade pulps. In one embodiment the elongation of the fibers prepared from a viscose containing pulp with high hemicellulose levels are at least equal to those prepared from a dissolving grade pulp alone. In another embodiment the modulus of the fibers prepared from a viscose containing pulp with high hemicellulose levels and a dissolving grade pulp are at least equal to those prepared from a dissolving grade pulp alone.

The chemical composition of the viscose fibers is given in Table 4.

TABLE 4

Hemicellulose Levels of Viscose Fibers

| Pulp | % Arabinose | % Galactose | % Glucose | % Xylose | % Mannose | Total % | % Total Hemicellulose |
|---|---|---|---|---|---|---|---|
| Beech Sulfite | <0.1 | <0.1 | 94.63 | 0.84 | 0.01 | 95.47 | 0.85 |
| 65% PHK/ 35% EK | <0.1 | <0.1 | 95.07 | 0.95 | 0.95 | 96.97 | 1.90 |
| 65% Beech Sulfite/35% EK | <0.1 | <0.1 | 94.72 | 1.05 | 0.90 | 96.68 | 1.96 |
| 85% PHK/ 15% EF | <0.1 | <0.1 | 94.08 | 1.02 | -.69 | 95.79 | 1.71 |
| 85% PHK/ 15% EK | <0.1 | <0.1 | 94.87 | 0.76 | 0.78 | 96.41 | 1.54 |
| 85% Beech Sulfite 15% EK | <0.1 | <0.1 | 94.71 | 0.96 | 0.41 | 96.08 | 1.37 |
| PHK | <0.1 | <0.1 | 95.59 | 0.76 | 0.68 | 97.03 | 1.44 |
| EK | <0.1 | <0.1 | 91.59 | 1.06 | 2.36 | 95.01 | 3.42 |

Total Hemicellulose represents the sum of xylan and mannan

In another embodiment the pulps are blended in a slurry process. In this case the pulp with high hemicellulose levels and the dissolving grade pulps can be added separately in sheet form to the alkaline medium and then mixed thoroughly to obtain a homogeneous fibrous slurry. Alternatively, each pulp can be added to separate steeping vessels, in sheet form, followed by disintegration in the steeping vessel, steeping the pulp, pressing the alkali cellulose (AC) after removal of the alkaline medium, and subsequently shredding the alkali cellulose for conversion to an alkali cellulose crumb. At this point the shredded alkali cellulose crumb can either be blended subsequent to shredding and aged as a uniform alkali cellulose blend or can be aged separately to a given D.P. and then blended. Alkali cellulose and viscose properties are shown in Table 5.

The dissolving pulps used for blending with the non dissolving grade pulp with high hemicellulose pulps can be either Kraft, sulfite, or cotton linters. Kraft and sulfite pulps can be made from southern or northern softwoods. Commercially available pulp used in this work included the following, a sulfite pulp from Saiccor with an $S_{18}$ of 6.01%, an $S_{10}$ of 9.94% and a hemicellulose level of ~2.3%; a Beech sulfite pulp from Lenzing with an $S_{18}$ of 7.45%, an $S_{10}$ of 11.72% and a hemicellulose level of 3.59%; a prehydrolyzed kraft pulp from Buckeye with an $S_{18}$ of 5.43%, an $S_{10}$ of 8.18% and a hemicellulose level of 3.19%; an experimental modified Kraft pulp made from sawdust with an $S_{18}$ of 15.23%, an $S_{10}$ of 16.81% and a hemicellulose level of ~12.5%, designated as EK; and an experimental modified Kraft pulp for viscose made from southern pine chips with an $S_{18}$ of 13.78% an $S_{10}$

TABLE 5

Alkali Cellulose and Viscose Properties Using Slurry Steeping

| Sample | 50% EF/ sulfite | 50% EF/ PHK | 25% EF/ sulfite | 25% EF/ PHK | 100% EF |
|---|---|---|---|---|---|
| Time to P.W.R., sec. | 15 | 15 | 15 | 15 | 15 |
| Aging Time, hrs | 6.5 | 5.25 | 6.5 | 5.25 | 6.3 |
| Final AC viscosity, cp | 10.5 | 10.5 | 10.6 | 10.3 | 11.5 |
| 70% Vacuum Recovery, min. | 41 | 42 | 47 | 52 | 50 |
| Filterability, x0.001 | 94 | 269 | 46 | 200 | 419 |
| Salt Index | 4.5 | 4.5 | 4.5 | 4.5 | 3.5 |
| Clarity, cm | 12.7 | 20.1 | 13.5 | 16.5 | 7.7 |
| Haze, x1000 | 92 | 59 | 86 | 75 | 115 |
| Mixer Ball Fall Viscosity, sec. | 45 | 77 | 40 | 57 | 123 |
| 19-Hour Ball Fall Viscosity, sec. | 30 | 58 | 37 | 44 | 85 |

In one embodiment in the slurry process, the pulp with high hemicellulose levels is blended with the dissolving grade pulp at a 50 percent level, or less, by total dry weight of pulp; in another embodiment the pulp with high hemicellulose levels is blended with the dissolving grade pulp at a level of 35 percent, or less, by total dry weight of pulp; in another embodiment the pulp with high hemicellulose levels is blended with the dissolving grade pulp at a 20 percent level, or less, by total dry weight of pulp; in yet another embodiment the pulp with high hemicellulose levels is blended with the dissolving grade pulp at a level of 10 percent, or less, by total dry weight of pulp.

of 16.01% and a hemicellulose level of ~12.5 designated as EF pulp. Analytical properties of all pulps used are shown in Tables 2 and 3.

$S_{18}$ as defined herein is 100-% $R_{18}$ where $R_{18}$ refers to the residual amount of undissolved material left after attempting to dissolve the pulp in an 18% caustic solution and is expressed as a percent. $S_{10}$ as defined herein is 100-% $R_{10}$ where $R_{10}$ refers to the residual amount of undissolved material left after attempting to dissolve the pulp in 10% caustic solution and is expressed as a percent. Generally, in a 10% caustic solution, hemicellulose and chemically degraded short chain cellulose are dissolved and removed in solution. In contrast, generally only hemicellulose is dissolved and removed in an 18% caustic solution. Thus, the difference between the $R_{10}$ value and the $R_{18}$ value represents the amount of chemically degraded short chained cellulose that is present in the pulp sample. $R_{10}$ value and the $R_{18}$ values were determined by TAPPI 235. The percent hemicellulose was determined by the method described in this application and represents the sum of the percent mannan and xylan in the pulp or fiber.

The modified Kraft pulp with high hemicellulose, designated as EF, can be made in a commercial continuous extended delignification process in the laboratory utilizing a specially built reactor vessel with associated auxiliary equipment, including circulating pumps, accumulators, and direct heat exchangers, etc. Reactor temperatures can be controlled by indirect heating and continuous circulation of cooking liquor. In the process, the reactor vessel is charged with a standard quantity of equivalent moisture free wood. An optional atmospheric pre-steaming step may be carried out prior to cooking. A quantity of cooking liquor, ranging from about 50% to 80% of the total, is then charged to the digester along with dilution water to achieve the target liquor to wood ratio. The reactor is then brought to impregnation temperature and pressure and allowed to remain for the target time. Following the impregnation period, an additional portion of the total cooking liquor is added to the reactor vessel, ranging from about 5% to 15% of the total. The reactor is then brought to cooking temperature and allowed to remain there for the target time period to simulate the co-current portion of the cook.

Following the co-current portion of the cook, the remainder of the cooking liquor can be added to the reactor vessel at a fixed rate. The rate is dependent on the target time period and proportion of cooking liquor used for this step of the cook. The reactor can be controlled at a target cooking temperature and allowed to remain there during the simulation of the counter-current portion of the cook. Spent cooking liquor can then be withdrawn from the reactor into an external collection container at the same fixed rate. At the end of the cook, the reactor vessel is slowly depressurized and allowed to cool below the flash point. The reactor vessel is then opened and the cooked wood chips collected, drained of liquor, washed, screened and made ready for testing. Typical conditions which can be used to make a modified Kraft pulp from southern pine chips that have high hemicellulose levels and designated as EK pulp in this application are given in Table 6.

TABLE 6

Pulping Process Parameters for Low Specific Gravity Wood

| | |
|---|---|
| Wood Chip S.G. | 0.410 |
| Pre-Steam @ 110° C., minutes | 5 |
| Impregnation: | |
| Time, minutes | 35 |
| % Effective Alkali, initial | 8.5 |
| % EA, second @ 5 minutes | 1.6 |
| % sulfidity | 29 |
| Liquor ratio | 4 |
| Temperature - degrees C. | 110 |
| Residual, G/L EA | 9.63 |
| Residual, % EA | 3.85 |
| pH | 12.77 |
| H-factor | 2 |
| Pressure Relief Time, Minutes | 3 |
| Co-Current: | |
| % Effective Alkali | 4.2 |
| % sulfidity | 29 |
| Liquor addition time, minutes | 1 |
| Temperature - degrees C. | 154 |
| Time to, minutes | 9 |
| Time at, minutes | 5 |
| Temperature - degrees C. | 170 |

TABLE 6-continued

Pulping Process Parameters for Low Specific Gravity Wood

| | |
|---|---|
| Time to, minutes | 51 |
| Time at, minutes | 3 |
| Residual, G/L EA | 9.42 |
| Residual, % EA | 3.77 |
| pH | 12.92 |
| H-factor | 649 |
| Counter-Current: | |
| % effective alkali | 8 |
| % sulfidity | 29.2 |
| Temperature - degrees C. | 171 |
| Time to, minutes | 54 |
| Time at, minutes | 0 |
| Temperature - degrees C. | 171 |
| Time to, minutes | 0 |
| Time at, minutes | 162 |
| EA, G/L - strength | 16.0 |
| Displacement rate, CC/M | 93 |
| Displacement volume, liters | 20.00 |
| Residual, G/L EA | 9.95 |
| Residual, % EA | 3.98 |
| pH | 12.74 |
| H-factor | 3877 |
| Total Time, minutes | 319 |
| % Effective Alkali - Total Cook | 22.3 |
| Accepts, % on O.D. Wood | 41.01 |
| Rejects, % on O.D. Wood | 0.03 |
| Total Yield, % on O.D. Wood | 41.04 |
| Kappa Number, 10 minutes | 16.80 |

Bleaching Process

The brownstock pulp was processed through an $ODE_PD$ stage using the following chemical addition levels:

Oxygen Stage

Sodium hydroxide was added at a rate of 32 kg/T and peroxide at 13.6 kg/T. Caustic strength of 12% was used and the top tray of the reactor was about 130° C.

D Stage

Chlorine Dioxide was added at 10-11.4 kg/T.

$E_P$ Stage

Caustic was added at a rate of about 27.3 kg/T. Hydrogen peroxide was added at a rate equivalent to 18.2 kg/T.

D Stage

Chloride dioxide was added at a rate of 12.3 kg/T.

Pulp treated in this manner has a hemicellulose, (xylan and mannan), content of 11.92%.

In another example, low specific gravity wood having a specific gravity of 0.410 was pulped using the Kraft process and subsequently bleached and treated with varying amounts of oxygen to reduce its viscosity. Components in the pulps made using low specific gravity wood chips are 7.2% xylans and 5.5% mannans for a total hemicellulose level of 12.7% by weight hemicellulose.

Table 7 shows typical properties of pulp from cooking a low specific gravity wood.

TABLE 7

| | |
|---|---|
| Chips Specific Gravity | 0.410 |
| Kappa of Brownstock | 24.4 |
| Yield, % | 43.2 |
| Brownstock pulp viscosity (cP) Falling Ball | 414 |
| Brownstock pulp WAFL (mm) | 2.70 |
| Brownstock pulp Coarseness (mg/100 m) | 18.3 |

TABLE 7-continued

| | |
|---|---|
| O$_2$ pulp viscosity cP | 55 |
| (50 g/kg NaOH) | 7.6 kappa |
| O$_2$ pulp viscosity cP | 80 |
| (30 g/kg NaOH) | 6.0 kappa |
| Bleached pulp coarseness | 32.4 |
| (mg/100 m) | |
| Bleached pulp fibers/g × 10$^6$ | 4.8 |
| Bleached pulp viscosity (cP) | 31.8 |
| Bleached pulp intrinsic viscosity | 4.1 |
| Bleached pulp Cu (ppm) | 0.6 |
| Bleached pulp Fe (ppm) | 12 |
| Bleached pulp Mn (ppm) | 1.5 |
| Bleached pulp Cr (ppm) | <0.4 |
| Bleached pulp Si (ppm) | 41 |

Pulping conditions used for typical wood chip having a specific gravity of 0.495 are shown in Table 8.

TABLE 8

Pulping Process Parameters for Non-Low Specific Gravity Wood

| | |
|---|---|
| Wood Chip S.G. | 0.495 |
| Pre-Steam @ 110 C., minutes | 5 |
| Impregnation: | |
| Time, minutes | 35 |
| % Effective Alkali, initial | 8.5 |
| % EA, second @ 5 minutes | 1.6 |
| % sulfidity | 30.5 |
| Liquor ratio | 4 |
| Temperature - degrees C. | 110 |
| Residual, G/L EA | 9.17 |
| Residual, % EA | 3.67 |
| pH | 13.24 |
| H-factor | 2 |
| Pressure Relief Time, Minutes | 2 |
| Co-Current: | |
| % Effective Alkali | 4.2 |
| % sulfidity | 30.5 |
| Liquor addition time, minutes | 1 |
| Temperature - degrees C. | 157 |
| Time to, minutes | 14 |
| Time at, minutes | 0 |
| Temperature - degrees C. | 170 |
| Time to, minutes | 54 |
| Time at, minutes | 0 |
| Residual, G/L EA | 8.31 |
| Residual, % EA | 3.32 |
| pH | 13.07 |
| H-factor | 680 |
| Counter-Current: | |
| % effective alkali | 8 |
| % sulfidity | 30.0 |
| Temperature - degrees C. | 171 |
| Time to, minutes | 54 |
| Time at, minutes | 0 |
| Temperature - degrees C. | 171 |
| Time to, minutes | 0 |
| Time at, minutes | 162 |
| EA, G/L - strength | 20.4 |
| Displacement rate, CC/M | 73 |
| Displacement volume, liters | 15.87 |
| Residual, G/L EA | 9.72 |
| Residual, % EA | 3.89 |
| pH | 13.18 |
| H-factor | 3975 |
| Total Time, minutes | 319 |
| % Effective Alkali - Total Cook | 22.3 |
| Accepts, % on O.D. Wood | 44.23 |
| Rejects, % on O.D. Wood | 0.13 |
| Total Yield, % on O.D. Wood | 44.36 |
| Kappa Number, 10 minutes | 17.75 |

Table 9 shows typical properties of pulp of three different cooks using a conventional wood chips made from a non-low specific gravity wood. Components in the pulps made using non-low specific gravity wood chips were 5.7% xylans; and 5.9% mannans.

TABLE 9

| | Inwoods chips Cook A | Inwoods chips Cook B | Inwoods chips Cook C |
|---|---|---|---|
| Chips Specific Gravity | 0.495 | 0.495 | 0.495 |
| Kappa of Brownstock | 26.9 | 20.8 | 17.8 |
| Yield, % | 46.6 | 46.1 | 44.4 |
| Brownstock pulp viscosity (cP) | 633 | 358 | 243 |
| Falling Ball | | | |
| Brownstock pulp WAFL (mm) | 4.13 | 4.14 | 4.19 |
| Brownsrock pulp Coarseness (mg/100 m) | 26.1 | 24.4 | 24.3 |
| O$_2$ pulp viscosity cP | 96 | 43 | 41 |
| (50 g/kg NaOH) | 6.4 kappa | 6.9 kappa | 4.7 kappa |
| O$_2$ pulp viscosity cP | 180 | 88 | 70 |
| (30 g/kg NaOH) | 8.3 kappa | 5.5 kappa | 6.2 kappa |
| Bleached pulp coarseness (mg/100 m) | 24.9 | | 27.5 |
| Bleached pulp fibers/g × 10$^6$ | 3.8 | | 2.8 |
| Bleached pulp viscosity (cP) | 28.5 | | 24.2 |
| Bleached pulp intrinsic viscosity | 4.3 | | 4 |
| Bleached pulp Cu (ppm) | <0.6 | | <0.7 |
| Bleached pulp Fe (ppm) | 11.5 | | 16.0 |
| Bleached pulp Mn (ppm) | 5 | | 6 |
| Bleached pulp Cr (ppm) | <0.4 | | 0.3 |
| Bleached pulp Si (ppm) | ≦1 | | 32 |

Example of Pulping Conditions—Modified Kraft Pulp, EK

Brownstock sawdust pulp was produced in an industrial scale M&D digester. The digester was operated at a temperature of about 182° C., and average residence time in the digester was about 60 minutes. White liquor was used as the cooking liquor in the digester. The white liquor had a total titratable alkali (TTA) of 115.2 grams per liter as Na$_2$O, an active alkali (AA) of 99.2 grams per liter as Na$_2$O, an effective alkali (EA) of 81.6 grams per liter as Na$_2$O. Sulfidity of the white liquor was 28% of TTA. Specific gravity of the white liquor was 1.15.

Northern Softwood sawdust unbleached alkaline kraft pulp (main wood species were Douglas fir, Spruce and Lodgepole pine), produced under the stated conditions, with a kappa number of 21.0 (TAPPI Standard T236 cm-85 and a viscosity of 110 cp (TAPPI T230) (D.P. of 1264), and a hemicellulose content of 14.1%±1.5%.

Brownstock was processed through five stage $D_0 E_{P1} D_1 E_{P2} D_2$ bleaching with a Papricycle stage intermediate $D_0$ and $E_{P1}$.

$D_0$ Stage

A chlorine dioxide level of 6.8-9.5 kg/ADMT at 68° C. was used.

Papricycle Stage

This stage was run at a target pH of 12.0 at 74° C. using 9.1 kg/ADMT.

$E_{P1}$ Stage

This stage is key to reducing viscosity. Peroxide was added at 22.7 kg/ADMT. Caustic was added at 22.7 kg/ADMT at 84° C. and a pH of 11.2.

$D_1$ Stage

ClO$_2$ was added at 12.5 kg/ADMT.

$E_{P2}$ Stage

Peroxide was added at 50 kg/ADMT and caustic at 29.5-31.8 kg/ADMT.

D₂ Stage
Chlorine dioxide was added at a level of 5 kg/ADMT.

Pulp Preparation for Use in Sheet Steeping

Pulp sheets, blended in the ratios shown in Tables 2, 2A, 3, and 3A were prepared with the modified Kraft pulps designated as EF pulp, prepared from southern pine chips and the modified Kraft pulp designated as EK pulp, prepared from northern softwood sawdust as follows. The appropriate amounts of dissolving pulp and high hemicellulose pulp, based on oven dry weight, and the ratios indicated in Tables 2, 2A, 3 and 3A were dispersed in water at a 3% consistency with a Lightning mixer. The resulting fibrous slurry was dewatered through a 30.5 cm×30.5 cm. screen, the dewatered mat pressed twice in a TAPPI press, and steam dried to make a 750 g/m², 0.55 g/cm³ sheet. As an example, an 85% PHK 15% EK means that the pulp sheet contained 85% by total oven dry weight PHK pulp and 15% by total oven dry weight of the non dissolving grade pulp with high hemicellulose.

Pulp Preparation for Use in Slurry Steeping

A fibrous mixture of a dissolving pulp and the non dissolving grade pulp with the high hemicellulose, designated as EF pulp, prepared from southern pine chips and a fibrous mixture of a dissolving grade pulp and the pulp with the high hemicellulose levels, designated as EK pulp, were prepared from northern softwood sawdust follows. The appropriate amounts of dissolving pulp and high hemicellulose pulp, based on oven dry weight, and the ratios indicted in Table 5 were dispersed in water at a 3% consistency with a Lightning mixer. The resulting fibrous slurry was dewatered, centrifuged, fluffed with a pin mill and air dried. The resulting fluffed pulp fibers were used for slurry steeping.

Sheet Steeping

Steeping was conducted in a steeping press using 12-14 sheets of the blended pulp, shown in Tables 2, and 3 and 18% caustic at ambient temperature for 40 minutes. The sheets were pressed out in a Blashke press to a press weight ratio (PWR) in 60 seconds at a pressure of 30 bar. Press weight ratio (PWR) is defined as the final weight of the alkali cellulose divided by the initial oven dry weight of cellulose. Oven dry weight is the weight of a sample after drying at 105° C. for at least one hour.

Shredding/Aging

The alkali cellulose sheets were shredded through a laboratory refiner and the shredded alkali cellulose crumb was aged at 28° C. to reach a target D.P. (CED, cupriethylenediamine solution) of 580. D.P. was determined by SCAN-CM-15:88. In the test, commercial cupriethylenediamine (cuene) solution, 1 mol/l was used at a concentration of 0.2% in a 50/50 mixture cuene (1 mol/l)/water at 25° C. The formula for the D.P. were as follows, D.P.<950:η=0.42×D.P. and D.P.>950:η=2.28×D.P.$^{0.76}$. Alkali and cellulose AC were determined as follows. Five g of AC and 25 ml. of 1N $H_2SO_4$ were mixed in a flask and diluted with water after 15 minutes. After an additional 5 minutes the mixture was titrated with 1 N NaOH using methyl orange as indicator. The percent alkali was calculated as $$\frac{(25-c) \times 4}{W}$$

where c is the concentration of NaOH, and W is the sample weight. Cellulose in AC was determined by thoroughly washing the precipitated cellulose of the AC analysis on a fritted funnel and drying the cellulose at 105° C. The percent cellulose was calculated as $$\frac{w \times 100}{W}$$

where w is the weight of the dried sample and W is the weight of the AC.

Xanthation/Dissolution/Filtration

The AC (alkali cellulose) crumb was dry xanthated in a rotating bottle. AC crumb was introduced into the bottle and the bottle evacuated. $CS_2$, 28 weight percent on dry cellulose was introduced into the bottle, and xanthation allowed to proceed for 1.5 hr. at 28° C.

Dissolution of the cellulose xanthate was conducted by mixing the xanthate crumb with caustic containing 0.1% hemicellulose for 2 hours at 2-12° C. to make an 8.5% cellulose, 6% caustic 28% $CS_2$ viscose solution. The viscose solution for spinning was filtered using Southwest Screens and Filters (Belgium) with three filter screens with openings of 20, 10, and 5 µm respectively. For filterability, a 400 ml tube is filled with viscose and a pressure of 2 bar is applied over a surface area of 4 cm² using a filter paper with an air permeability of 15±2 l/m in. In the test, the quantity of viscose filtered in the first 20 minutes is measured in grams (a), and then in the next 20 to 60 minutes the viscose is measured in grams (b). Based on these values, the filterability is calculated as KW=100000×(2−b/a)/(a+b). KR is the viscosity corrected filterability according to the following equation, KR=F×KW/η$^{0.4}$ where η is the ball fall time of a 3.18 mm ball in seconds and F is the filter surface area of 4 cm². A good filterability range for KW and KR is 500 and less. The viscose was ripened at 20 to 25° C. to the 8° H range. H is the Hottenroth degree or number and represents the number of milliliters of 10% ammonium chloride that is necessary to add to a diluted viscose to induce incipient coagulation under standard conditions. In the test, 20 g of viscose was diluted with 30 ml water and titrated with 10% ammonium chloride solution to coagulation. The Degree of Substitution (D.S.) of the xanthate group was determined on viscose immediately after completion of mixing. Ball fall viscosity, filtration value and particle count were determined after 20 hours of ripening. Ball fall viscosity is the time required in seconds for a 3.18 mm steel ball to fall 20 cm in viscose in a 20 cm. diameter cylinder at 20° C. Particle count was determined with PAMAS particle counter. The D.S. (degree of substitution) of the xanthate group was determined as follows. One grain of viscose is dissolved in 100 ml cold water and then, under cooling, $CO_2$ is fed into the solution to the point where hydrogen sulfide is not detected with lead acetate (2) paper in the $CO_2$ stream. The solution is then titrated with 0.02% Iodine— solution using starch as indicator. The gamma value is calculated as (a×32.4)/W×b, where a is the volume of 0.02 percent iodine—solution, b is the cellulose in viscose and W is the sample weight. The alkali and cellulose in viscose were determined as follows. Two to three grams of viscose were accurately weighed and dissolved in 100 ml. water. Twenty ml. of 0.5 N $H_2SO_4$ was added and the mixture shaken. The mixture was titrated after 30 minutes with 0.5 N NaOH using methyl red as indicator and the alkali content calculated as follows $$\% \text{ alkali} = \frac{(20-a) \times 2}{W}$$

where a is the volume of 0.5 N NaOH consumed and W is the weight of the viscose sample. The cellulose content in viscose was determined by accurately weighing 3 grams of viscose onto a slide and the viscose pressed to a thin film with a second slide. The two slides are separated and each slide dried for 15 min. at 50° C., then immersed in a bath containing 10% $H_2SO_4$. The films are then washed thoroughly and dried at 105° C. and the cellulose content in the viscose calculated.

Spinning

The viscose was spun through a 40 hole spinnerette with 70 μm holes into a coagulation bath of 80 g/l sulfuric acid, 240 g/l sodium sulfate and 30 g/l zinc sulfate at 48° C. A decomposition bath containing 50 g/l sulfuric acid and 20 g/l sodium sulfate was used. The single fiber titer was 2.8 dtex. Washing was conducted on the first mating roll at ambient temperature and on mating rolls two and three at 60° C. The filaments were finished with Stocko MW 5866. Two rolls were dried at once at a temperature of 100° C. to 70° C. Shrinkage was 1.5%, draw ratio 1.2 and a spinning speed of 40 m/min.

Slurry Steeping

In cases where Saiccor pulp was blended with EF pulp, each pulp was first dispersed in water, the two fibrous mixtures then blended into a single mixture, stirred, dewatered, and made into sheets. The resulting sheets were air dried and then a fixed weight of pulp introduced into the slurry steeping vessel containing 17.8 percent sodium hydroxide, stirred to disintegrate the sheets, and steeped for 30 minutes at 45° C. In the case where PHK pulp was used, the pulp was first cut into 1.25×1.25 cm. squares and then disintegrated together with the EF pulp, in sheet form, in the slurry medium. The resulting slurry was then processed as previously described. In both cases, the resulting slurry was drained to recover the alkali cellulose and then pressed to a PWR of 2.95. The pressed alkali cellulose was then shredded in a high speed shredder to yield alkali cellulose crumb. The AC crumb was aged at 46.5° C. and viscosity determined by TAPPI T25. Xanthation was conducted with 28% by weight carbon disulfide on dry weight of cellulose basis for 60 minutes at 31° C. The resulting xanthate crumb was dissolved in caustic to make a 9.0/5.5/28 composition viscose. The resulting viscose solution was ripened at 18° C. and filterability determined on the ripened viscose using a filter pack containing one piece of muslin cloth, one piece of Whatman 54 filter paper and two pieces of canton flannel. The muslin and flannel were obtained from Celanese Corp. of America. In the method the volume of filtrate is recorded every ten minutes and a graph of time vs. time/volume is plotted to obtain a slope.

Sugar Analysis

This method is applicable for the preparation and analysis of pulp and wood samples for the determination of the amounts of the following pulp sugars: fucose, arabinose, galactose, rhamnose, glucose, xylose and mannose using high performance anion exchange chromatography and pulsed amperometric detection (HPAEC/PAD).

Summary of Method

Polymers of pulp sugars are converted to monomers by hydrolysis using sulfuric acid.

Samples are ground, weighed, hydrolyzed, diluted to 200-mL final volume, filtered, diluted again (1.0 mL+8.0 mL $H_2O$) in preparation for analysis by HPAEC/PAD.

Sampling, Sample Handling and Preservation

Wet samples are air-dried or oven-dried at 25±5° C.

Equipment Required

Autoclave, Market Forge, Model # STM-E, Serial # C-1808
100×10 mL Polyvials, septa, caps, Dionex Cat #55058
Gyrotory Water-Bath Shaker, Model G76 or some equivalent.
Balance capable of weighing to +0.01 mg, such as Mettler HL52 Analytical Balance.
Intermediate Thomas-Wiley Laboratory Mill, 40 mesh screen.
NAC 1506 vacuum oven or equivalent.
0.45-μ GHP filters, Gelman type A/E, (4.7-cm glass fiber filter discs, without organic binder)
Heavy-walled test tubes with pouring lip, 2.5×20 cm.
Comply SteriGage Steam Chemical Integrator
GP 50 Dionex metal-free gradient pump with four solvent inlets
Dionex ED 40 pulsed amperometric detector with gold working electrode and solid state reference electrode
Dionex autosampler AS 50 with a thermal compartment containing the columns, the ED 40 cell and the injector loop
Dionex PC10 Pneumatic Solvent Addition apparatus with 1-L plastic bottle
3 2-L Dionex polyethylene solvent bottles with solvent outlet and helium gas inlet caps
CarboPac PA1 (Dionex P/N 035391) ion-exchange column, 4 mm×250 mm
CarboPac PA1 guard column (Dionex PIN 043096), 4 mm×50 mm
Millipore solvent filtration apparatus with Type HA 0.45 u filters or equivalent Reagents Required All references to $H_2O$ is Millipore $H_2O$
72% Sulfuric Acid Solution (H2SO4)—Transfer 183 mL of water into a 2-L Erlenmeyer flask. Pack the flask in ice in a Rubbermaid tub in a hood and allow the flask to cool. Slowly and cautiously pour, with swirling, 470 mL of 96.6% $H_2SO_4$ into the flask. Allow solution to cool. Carefully transfer into the bottle holding 5-mL dispenser. Set dispenser for 1 mL.
JT Baker 50% sodium hydroxide solution, Cat. No. Baker 3727-01, [1310-73-2]
Dionex sodium acetate, anhydrous (82.0±0.5 grams/l L $H_2O$), Cat. No. 59326, [127-09-3].

Standards

Internal Standards

Fucose is used for the kraft and dissolving pulp samples. 2-Deoxy-D-glucose is used for the wood pulp samples.
Fucose, internal standard. 12.00±0.005 g of Fucose, Sigma Cat. No. F 2252, [2438-80-4], is dissolved in 200.0 mL $H_2O$ giving a concentration of 60.00±0.005 mg/mL. This standard is stored in the refrigerator.
2-Deoxy-D-glucose, internal standard. 12.00±0.005 g of 2-Deoxy-D-glucose, Fluka Cat. No. 32948 g [101-77-9] is dissolved in 200.0 mL $H_2O$ giving a concentration of 60.00±0.005 mg/mL. This standard is stored in the refrigerator.

Kraft Pulp Stock Standard Solution

| KRAFT PULP SUGAR STANDARD CONCENTRATIONS | | | |
| --- | --- | --- | --- |
| Sugar | Manufacturer | Purity | g/200 mL |
| Arabinose | Sigma | 99% | 0.070 |
| Galactose | Sigma | 99% | 0.060 |
| Glucose | Sigma | 99% | 4.800 |
| Xylose | Sigma | 99% | 0.640 |
| Mannose | Sigma | 99% | 0.560 |

Kraft Pulp Working Solution

Weigh each sugar separately to 4 significant digits and transfer to the same 200-mL volumetric flask. Dissolve sugars in a small amount of water. Take to volume with water, mix well, and transfer contents to two clean, 4-oz. amber bottles. Label and store in the refrigerator. Make working standards as in the following table.

| PULP SUGAR STANDARD CONCENTRATIONS FOR KRAFT PULPS | | | | | | |
|---|---|---|---|---|---|---|
| Fucose Sugar | mg/mL | mL/200 mL 0.70 ug/mL | mL/200 mL 1.40 ug/mL | mL/200 mL 2.10 ug/mL | mL/200 mL 2.80 ug/mL | mL/200 mL 3.50 ug/mL |
| Fucose | 60.00 | 300.00 | 300.00 | 300.00 | 300.00 | 300.00 |
| Arabinose | 0.36 | 1.2 | 2.5 | 3.8 | 5.00 | 6.508 |
| Galactose | 0.30 | 1.1 | 2.2 | 3.30 | 4.40 | 5.555 |
| Glucose | 24.0 | 84 | 168.0 | 252.0 | 336.0 | 420.7 |
| Xylose | 3.20 | 11 | 22.0 | 33.80 | 45.00 | 56.05 |
| Mannose | 2.80 | 9.80 | 19.0 | 29.0 | 39.0 | 49.07 |

Dissolving Pulp Stock Standard Solution

| DISSOLVING PULP SUGAR STANDARD CONCENTRATIONS | | | |
|---|---|---|---|
| Sugar | Manufacturer | Purity | g/100 mL |
| Glucose | Sigma | 99% | 6.40 |
| Xylose | Sigma | 99% | 0.120 |
| Mannose | Sigma | 99% | 0.080 |

Dissolving Pulp Working Solution

Weigh each sugar separately to 4 significant digits and transfer to the same 200-mL volumetric flask. Dissolve sugars in a small amount of water. Take to volume with water, mix well, and transfer contents to two clean, 4-oz. amber bottles. Label and store in the refrigerator. Make working standards as in the following table.

| PULP SUGAR STANDARD CONCENTRATIONS FOR DISSOLVING PULPS | | | | | | |
|---|---|---|---|---|---|---|
| Fucose Sugar | mg/mL | mL/200 mL 0.70 ug/mL | mL/200 mL 1.40 ug/mL | mL/200 mL 2.10 ug/mL | mL/200 mL 2.80 ug/mL | mL/200 mL 3.50 ug/mL |
| Fucose | 60.00 | 300.00 | 300.00 | 300.00 | 300.00 | 300.00 |
| Glucose | 64.64 | 226.24 | 452.48 | 678.72 | 904.96 | 1131.20 |
| Xylose | 1.266 | 4.43 | 8.86 | 13.29 | 17.72 | 22.16 |
| Mannose | 0.8070 | 2.82 | 5.65 | 8.47 | 11.30 | 14.12 |

Wood Pulp Stock Standard Solution

| WOOD PULP SUGAR STANDARD CONCENTRATIONS | | | |
|---|---|---|---|
| Sugar | Manufacturer | Purity | g/200 mL |
| Fucose | Sigma | 99% | 12.00 |
| Rhamnose | Sigma | 99% | 0.0701 |

Dispense 1 mL of the fucose solution into a 200-mL flask and bring to final volume. Final concentration will be 0.3 mg/mL.

Wood Pulp Working Solution

Use the Kraft Pulp Stock solution and the fucose and rhamnose stock solutions. Make working standards as in the following table.

| PULP SUGAR STANDARD CONCENTRATIONS FOR KRAFT PULPS | | | | | | |
|---|---|---|---|---|---|---|
| 2-Deoxy-D-glucose Sugar | mg/mL | mL/200 mL 0.70 ug/mL | mL/200 mL 1.40 ug/mL | mL/200 mL 2.10 ug/mL | mL/200 mL 2.80 ug/mL | mL/200 mL 3.50 ug/mL |
| 2-DG | 60.00 | 300.00 | 300.00 | 300.00 | 300.00 | 300.00 |
| Fucose | 0.300 | 1.05 | 2.10 | 3.15 | 4.20 | 6.50 |
| Arabinose | 0.36 | 1.2 | 2.5 | 3.8 | 5.00 | 6.508 |
| Galactose | 0.30 | 1.1 | 2.2 | 3.30 | 4.40 | 5.555 |
| Rhamnose | 0.3500 | 1.225 | 2.450 | 3.675 | 4.900 | 6.125 |
| Glucose | 24.00 | 84 | 168.0 | 252.0 | 336.0 | 420.7 |
| Xylose | 3.20 | 11 | 22.0 | 33.80 | 45.00 | 56.05 |
| Mannose | 2.80 | 9.80 | 19.0 | 29.0 | 39.0 | 49.07 |

Procedure

Sample Preparation

Grind 0.2±0.5 a sample with Wiley Mill 40 Mesh screen size. Transfer ~200 mg of sample into 40-mL Teflon container and cap. Dry overnight in the vacuum oven at 50° C.

Add 1.0 mL 72% $H_2SO_4$ to test tube with the Brinkman dispenser. Stir and crush with the rounded end of a glass or Teflon stirring rod for one minute. Turn on heat for Gyrotory Water-Bath Shaker. The settings are as follows:

Heat: High
Control Thermostat: 7° C.
Safety thermostat: 25° C.
Speed: Off
Shaker: Off Place the test tube rack in gyrotory water-bath shaker. Stir each sample 3 times, once between 20-40 min, again between 40-60 min, and again between 60-80 min. Remove the sample after 90 min. Dispense 1.00 mL of internal standard (Fucose) into Kraft samples.

Tightly cover samples and standard flasks with aluminum foil to be sure that the foil does not come off in the autoclave.

Place a Comply SteriGage Steam Chemical Integrator on the rack in the autoclave. Autoclave for 60 minutes at a pressure of 14-16 psi (95-105 kPa) and temperature >260° F. (127° C.).

Remove the samples from the autoclave. Cool the samples. Transfer samples to the 200-mL volumetric flasks. Add 2-deoxy-D-glucose to wood samples. Bring the flask to final volume with water.

For Kraft and Dissolving Pulp Samples:
Filter an aliquot of the sample through GHP 0.45µ filter into a 16-mL amber vial.

For Wood Pulp Samples:
Allow particulates to settle. Draw off approximately 10 mL of sample from the top, trying not to disturb particles and filter the aliquot of the sample through GHP 0.45µ filter into a 16-mL amber vial. Transfer the label from the volumetric flask to the vial. Add 1.00 mL aliquot of the filtered sample with to 8.0 mL of water in the Dionex vial.

Samples are run on the Dionex AS/500 system. See Chromatography procedure below.

Chromatography Procedure

Solvent Preparation

Solvent A is distilled and deionized water (18 meg-ohm), sparged with helium while stirring for a minimum of 20 minutes, before installing under a blanket of helium, which is to be maintained regardless of whether the system is on or off.

Solvent B is 400 mM NaOH. Fill Solvent B bottle to mark with water and sparge with helium while stirring for 20 minutes. Add appropriate amount of 50% NaOH.

(50.0 g NaOH/100 g solution)*(1 mol NaOH/40.0 g NaOH)*(1.53 g solution/1 mL solution)*(1000 mL solution/1 L solution)=19.1 M NaOH in the container of 50/50 w/w NaOH.

0.400 M NaOH*(1000 mL $H_2O$/19.1 M NaOH)=20.8 mL NaOH

Round 20.8 mL down for convenience:

19.1 M*(20.0 mL×mL)=0.400 M NaOH×mL=956 mL

Solvent D is 200 mM sodium acetate. Using 18 meg-ohm water, add approximately 450 mL deionized water to the Dionex sodium acetate container. Replace the top and shake until the contents are completely dissolved. Transfer the sodium acetate solution to a 1-L volumetric flask. Rinse the 500-mL sodium acetate container with approximately 100 mL water, transferring the rinse water into the volumetric flask. Repeat rinse twice. After the rinse, fill the contents of the volumetric flask to the 1-L mark with water. Thoroughly mix the eluent solution. Measure 360±10 mL into a 2-L graduated cylinder. Bring to 1800±10 mL. Filter this into a 2000-mL sidearm flask using the Millipore filtration apparatus with a 0.45 pm, Type HA membrane. Add this to the solvent D bottle and sparge with helium while stirring for 20 minutes.

The post-column addition solvent is 300 mM NaOH. This is added post-column to enable the detection of sugars as anions at pH>12.3. Transfer 15±0.5 mL of 50% NaOH to a graduated cylinder and bring to 960±10 mL in water.

(50.0 g NaOH/100 g Solution)*(1 mol NaOH/40.0 g NaOH)*(1.53 g Solution/1 mL Solution)(1000 mL Solution/1 L solution)=19.1 M NaOH in the container of 50/50 w/w NaOH.

0.300 M NaOH*(1000 ml H2O/19.1 M NaOH)=15.7 mL NaOH

Round 15.7 mL down:

19.1M*(15.0 mL/×mL)=0.300 M NaOH×mL=956 mL (Round 956 mL to 960 mL. As the pH value in the area of 0.300 M NaOH is steady, an exact 956 mL of water is not necessary.)

Set up the AS 50 schedule.

Injection volume is 5 uL for all samples, injection type is "Full", cut volume is 10 uL, syringe speed is 3, all samples and standards are of Sample Type "Sample". Weight and Int. Std. values are all set equal to 1.

Run the five standards at the beginning of the run in the following order:

STANDARD A1 DATE
STANDARD B1 DATE
STANDARD C1 DATE
STANDARD D1 DATE
STANDARD E1 DATE

After the last sample is run, run the mid-level standard again as a continuing calibration verification Run the control sample at any sample spot between the beginning and ending standard runs.

Run the samples.

Calculations

Calculations for Weight Percent of the Pulp Sugars $$\text{Normalized area for sugar} = \frac{(\text{Area sugar}) * (\mu g/mL \text{ fucose})}{(\text{Area Fucose})}$$

$$IS \text{ Corrected sugar amount} \left(\mu g/mL = \frac{((\text{Normalized area for sugar}) - (\text{intercept}))}{(\text{slope})}\right.$$

$$\text{Monomer Sugar Weight \%} = \frac{IS - \text{Corrected sugar amt} (\mu g/mL)}{\text{Sample wt. (mg)}} * 20$$

Example for Arabinose:

$$\text{Monomer Sugar Weight\%} = \frac{0.15 \, \mu g/mL \text{ arabinose}}{70.71 \text{ mg arabinose}} * 20 = 0.043\%$$

Polymer Weight %=(Weight % of Sample sugar)*(0.88)

Example for Arabinan:

Polymer Sugar Weight %=(0.043 wt %)*(0.88)=0.038 Weight

Note: Xylose and arabinose amounts are corrected by 88% and fucose, galactose, rhamnose, glucose, and mannose are corrected by 90%.

Report results as percent sugars on an oven-dried basis.

Various embodiments of the invention have been described. One of ordinary skill will be able to substitute equivalents without departing from the broad concepts imparted herein. It is therefore intended that the present disclosure be limited only by the definition contained in the appended claims.

What is claimed is:

1. A viscose product, comprising:
   at least 3.8 percent by weight hemicellulose; and
   cellulose, wherein the non dissolving grade pulp used to make the product has a D.P. of at least 700, a hemicellulose level of at least 10% by weight, an $S_{18}$ of at least 13% by weight and an $S_{10}$ of at least 15% by weight.

2. The viscose product of claim 1 wherein the tensile strength is at least 20 cN/tex.

3. The viscose product of claim 1 wherein the elongation is at least 12%.

4. The viscose product of claim 1 wherein the modulus is at least 1000.

5. The viscose product of claim 1 wherein the product is one of a film or a fiber.

* * * * *